(12) United States Patent
Sharma

(10) Patent No.: US 7,218,852 B1
(45) Date of Patent: May 15, 2007

(54) SYSTEM AND METHOD FOR OPTICAL LIGHT PATH DISCOVERY

(75) Inventor: Anirban Sharma, Raleigh, NC (US)

(73) Assignee: Ciena Corporation, Linthicum, MD (US)

( * ) Notice: Subject to any disclaimer, the term of this patent is extended or adjusted under 35 U.S.C. 154(b) by 747 days.

(21) Appl. No.: 10/325,161

(22) Filed: Dec. 20, 2002

Related U.S. Application Data

(60) Provisional application No. 60/343,502, filed on Dec. 21, 2001.

(51) Int. Cl.
*H04J 14/00* (2006.01)

(52) U.S. Cl. .......................... 398/48; 398/25; 398/34; 398/43

(58) Field of Classification Search ................. 398/27, 398/45, 57, 49, 59, 66, 25, 30
See application file for complete search history.

(56) References Cited

U.S. PATENT DOCUMENTS

| | | | | |
|---|---|---|---|---|
| 5,590,117 A | * | 12/1996 | Iida et al. .................... 370/248 |
| 5,914,798 A | * | 6/1999 | Liu ............................... 398/7 |
| 6,041,049 A | * | 3/2000 | Brady ........................ 370/351 |
| 6,690,884 B1 | * | 2/2004 | Kelty et al. .................. 398/27 |
| 6,728,484 B1 | * | 4/2004 | Ghani ......................... 398/42 |
| 6,996,342 B2 | * | 2/2006 | Park et al. .................... 398/48 |
| 2002/0191247 A1 | * | 12/2002 | Lu et al. ..................... 359/124 |
| 2003/0189926 A1 | * | 10/2003 | Watanabe et al. ........... 370/389 |
| 2005/0271038 A1 | * | 12/2005 | Xin et al. .................... 370/351 |

* cited by examiner

*Primary Examiner*—Kenneth Vanderpuye
*Assistant Examiner*—Luis Garcia
(74) *Attorney, Agent, or Firm*—Clements Walker; Christopher L. Bernard; Tyler S. Brown

(57) ABSTRACT

A system and method for discovering lightpath information in an optical network is disclosed. A selected node is requested to provide lightpath information. The node, in turn, requests the other node of the optical network to provide channel attribute data. The node processes the channel attribute data of a plurality of nodes to determine the lightpath information.

23 Claims, 8 Drawing Sheets

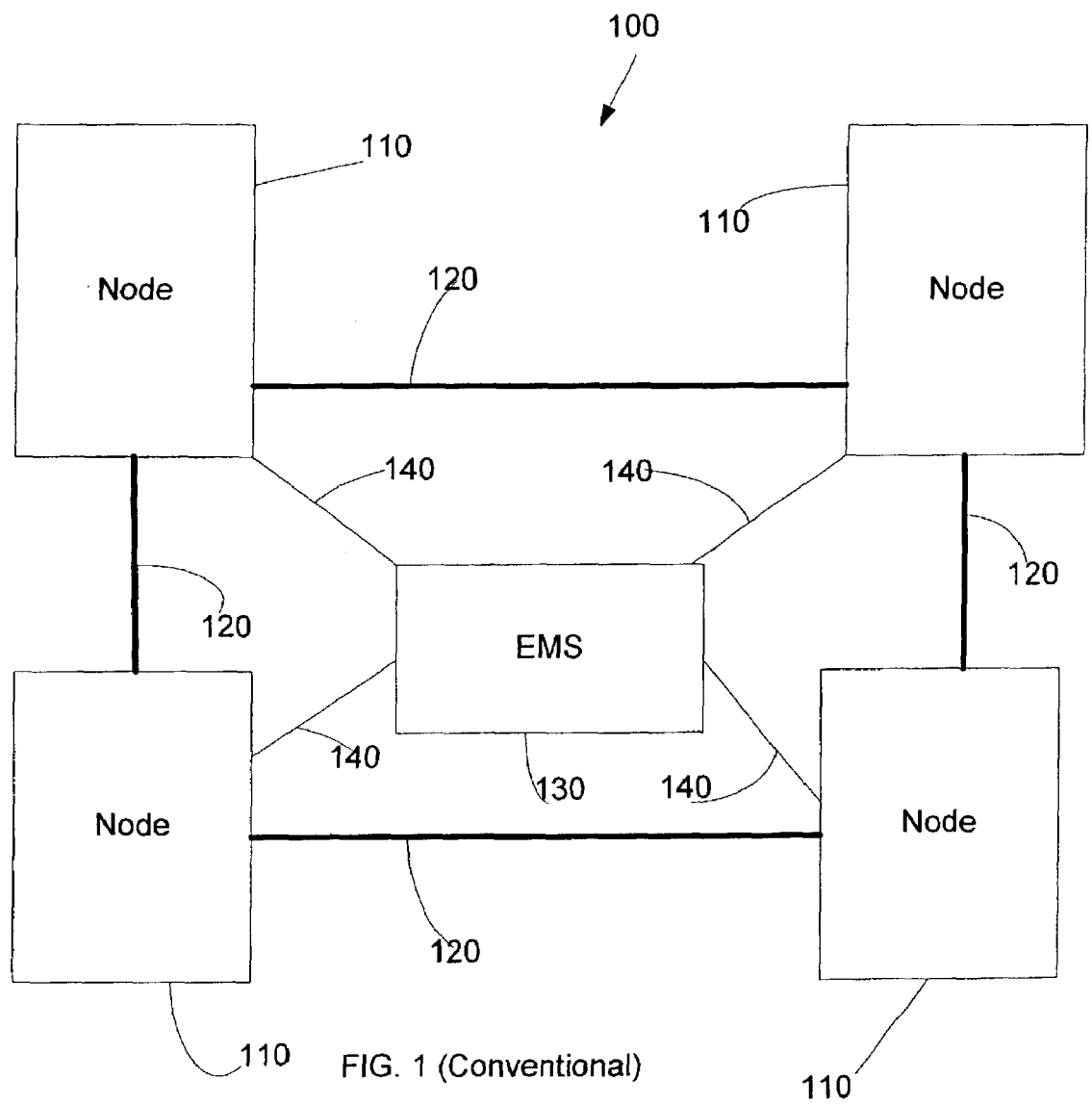
FIG. 1 (Conventional)

SYSTEM AND METHOD FOR OPTICAL LIGHT PATH DISCOVERY

RELATED APPLICATIONS

This application claims priority under 35 U.S.C.§ 119(e) to U.S. Patent Application No. 60/343,502, entitled "Optical Lightpath Discovery," filed Dec. 21, 2001, the contents of which are hereby incorporated by reference in their entirety in the present patent application.

BACKGROUND OF THE INVENTION

1. Field of the Invention

The present invention relates generally to obtaining lightpath information for managing an optical network. More particularly, the present invention is directed to discovering and/or validating optical light paths.

2. Description of Background Art

An optical network commonly includes an external network management system having a management interface for managing a plurality of optical nodes. Referring to the exemplary prior art network of FIG. 1, an optical network 100 may comprise a plurality of optical nodes 110 coupled to each other by optical fiber spans 120, with each optical fiber span including at least one optical fiber (e.g., in some bi-directional networks each span has at least two fibers, one for each direction of communication). In a wavelength division multiplexed (WDM) optical network, an optical service can be provided between two nodes 110 using an optical wavelength channel. A light path is commonly defined as a connection between two nodes in the network that is established by assigning a dedicated wavelength along each link of the path. A light path of a WDM optical network commonly utilizes the same wavelength channel throughout each link of its path, although in some cases the initial wavelength may be converted into a different wavelength along one of the nodes of the light path.

An element management system (EMS) 130 is used for high level administration of the optical network. EMS 130 may be communicatively coupled to each node via an Ethernet or other suitable data link 140.

In a conventional WDM optical network, part of the administrative function of EMS 130 is to provision the network to provide a desired service between a source node and a destination node. In order to fulfill this function, EMS 130 needs to know lightpaths capable of providing a desired service between two nodes. In many WDM optical networks, the individual nodes include one or more microprocessors for controlling the function of the node. The hardware and software complexity of a node may exacerbate the difficulty in determining a valid lightpath. Additionally, individual nodes may experience hardware or software upgrades, increasing the complexity of determining valid lightpaths.

BRIEF DESCRIPTION OF THE DRAWINGS

FIG. 1 is a functional block diagram of a conventional optical network.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

The present invention generally comprises an apparatus, system, and method in which an external management interface delegates the task of discovering lightpath information to one of the nodes of the network. The selected node acquires light path (commonly written as "lightpath") information responsive to a request from the external management interface, such as an interface to an external Element Management System (EMS), a Craft Interface Terminal (CIT) or other node client interface, such as management interface using a Simple Network Management Protocol (SNMP), Transaction Language 1 (TL1), or Command Line Interface (CLI).

Figure 2:
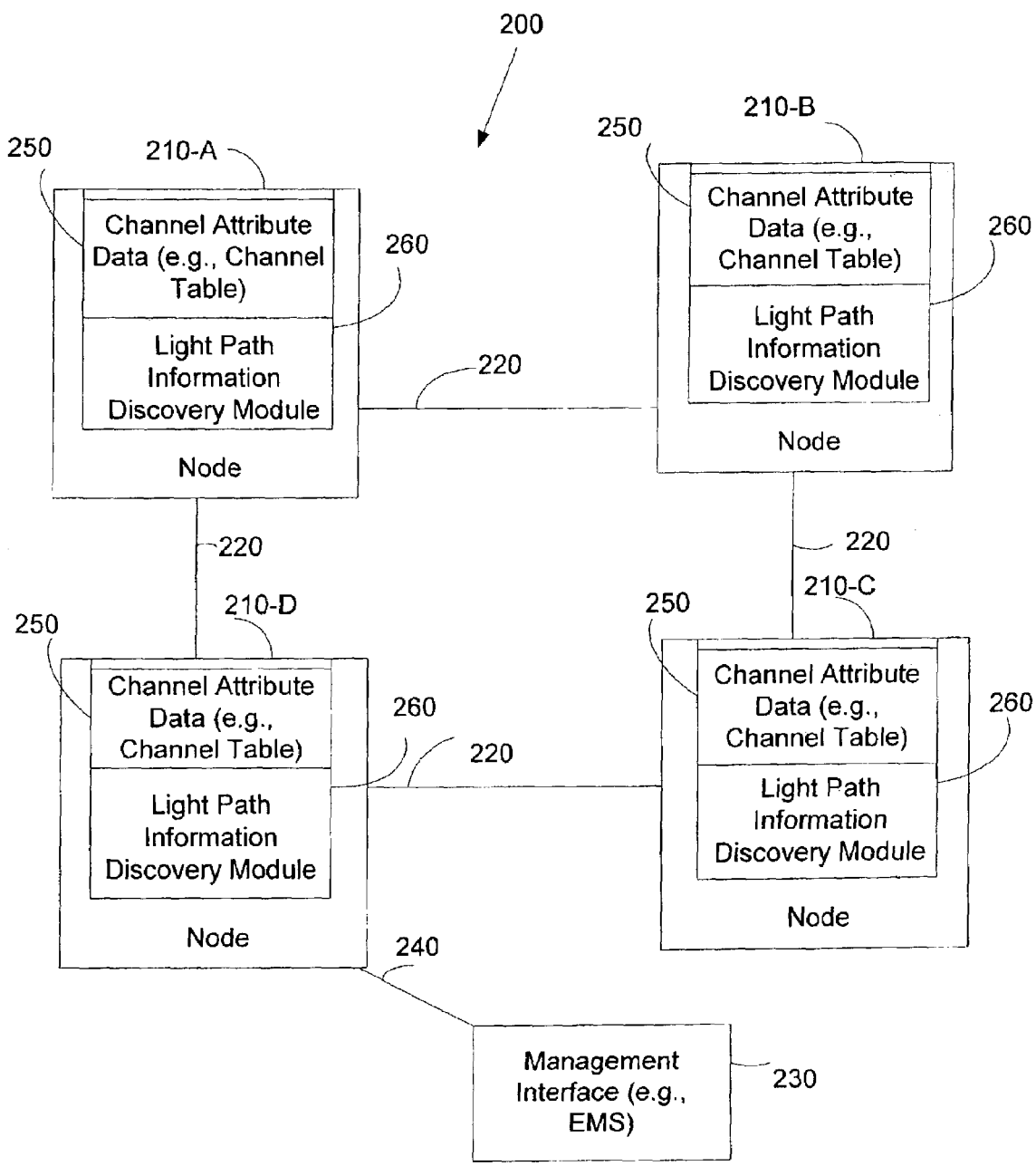
FIG. 2 is a functional block diagram of an optical network of the present invention including lightpath discovery modules.

Referring to FIG. 2, in one embodiment a wavelength division multiplexed (WDM) optical network 200 includes a plurality of optical nodes 210-A, 210-B, 210-C, and 210-D coupled by optical fiber links 220. Each optical fiber link includes at least one optical fiber. A dedicated inter-node channel (e.g., an optical supervisory channel) may be included to permit inter-node communications via the optical fiber links. Inter-node communications may also be provided in-band, by interspersing communications data with payload data. An Ethernet or other communication link 240 is included to permit communication from an EMS 230 to an individual node or nodes.

Each node 210 includes a lightpath information discovery module 260. Channel attribute data 250 within each node 210 is accessible by its associated lightpath information discovery module 260. The channel attribute data may comprise a channel table of wavelength channels added, dropped, and passing through the node. Additionally, the channel attribute data 250 may include other node attributes associated with a lightpath serviced by the node. As illustrative examples, the channel attribute data 250 may include data rate limitations of relevant components, such as transceivers; quality of service attributes, such as fault protection attributes; attributes of any forward error correction (FEC) modules employed in the transceivers to improve the signal-to-noise ratio; or other attributes of node components associated with servicing an optical wavelength channel.

In the present invention, one of the nodes, such as node 210-D, receives a request from a management interface, such as EMS 230, for lightpath information, i.e., the management interface delegates the task of discovering the lightpath information to one of the nodes of the network. In response, the lightpath information discovery module 260 of the selected node 210-D requests channel attribute data 250 from the other nodes, such as nodes 210-A, 210-B, and 210-C, using an internode communication protocol. Each of the nodes returns a node identifier along with its channel attribute data. The selected node then consolidates the attribute data of a plurality of nodes to form consolidated attribute data and applies one or more information discovery rules to determine the requested lightpath information. In one embodiment, the selected node consolidates the channel attribute data of all of the nodes, including its own channel attribute data. The selected node then outputs the requested information, e.g., processes the channel attribute data and returns the requested information to a management interface such as an EMS. A preferred embodiment includes compatible lightpath information discovery modules 260 such that any of the nodes may be delegated the task of discovering lightpath information by a management interface.

Figure 3:
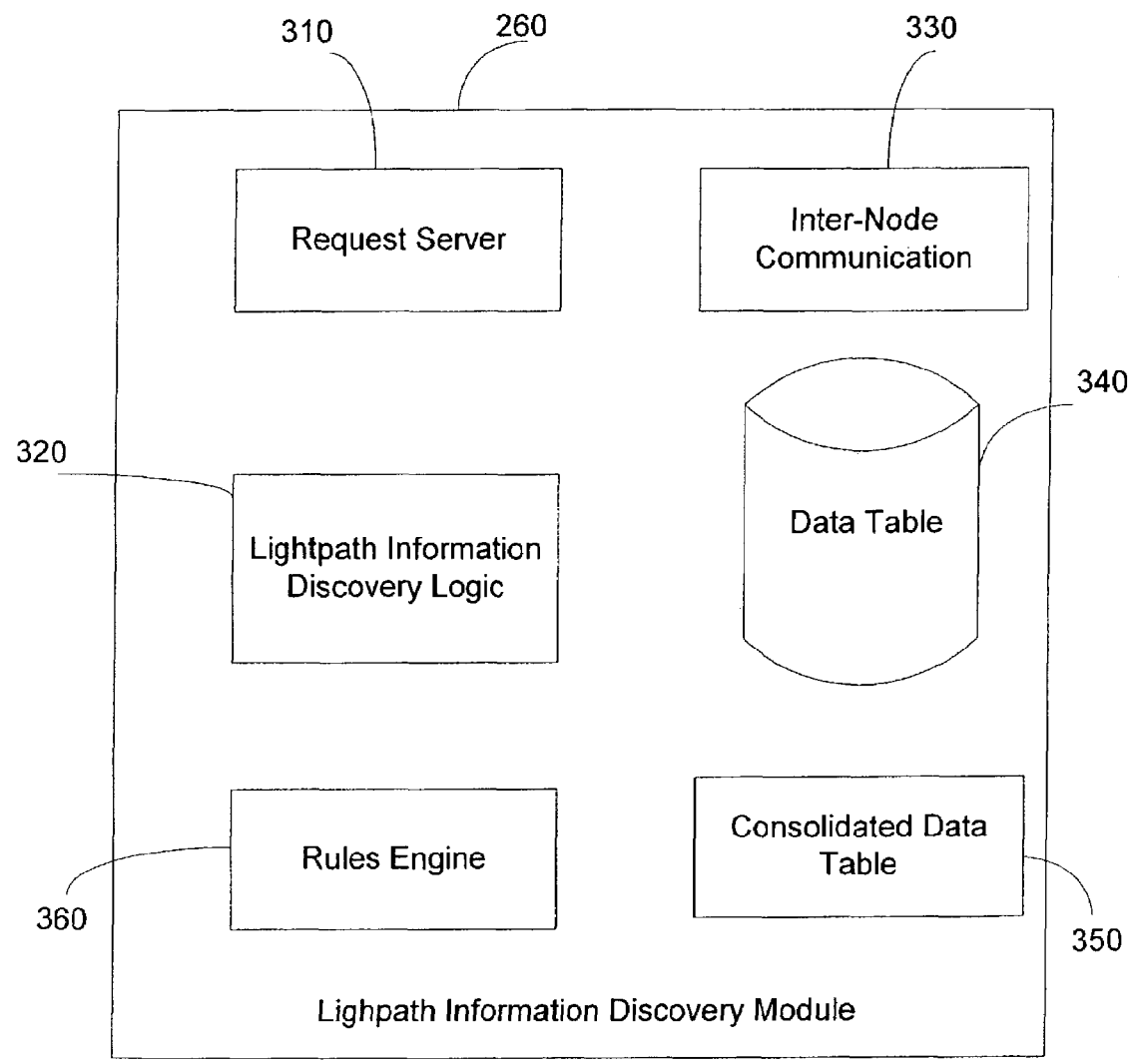
FIG. 3 is functional block diagram of one embodiment of a lightpath information discovery module according to the present invention.

FIG. 3 is a block diagram of one embodiment of a lightpath information discovery module 260 for discovering lightpath information. In one embodiment, lightpath information discovery module 260 is implemented as a plurality of software modules residing on the memory of a local node computer, such as a microprocessor associated with an administrative complex 460 of a WDM node (shown in FIG. 4B). It will be understood that lightpath information discovery module 260 is communicatively coupled to the inter-node communication system (e.g., OSC modules 440 of FIG. 4B) and to an external management interface.

In one embodiment, the EMS provides software updates as required to the nodes so that each node runs compatible lightpath information discovery software. If desired, the nodes may also include self-checking features to confirm that they are operating compatible software and receive upgrades, as required, to maintain compatibility of the software and data protocols of the lightpath information discovery module 260 of each node.

Referring to FIG. 3, a request server 310 is responsible for handling requests for lightpath information from an external management interface, such as an EMS or craft interface terminal (CIT). The request server 310 delegates a lightpath information request to a lightpath information discovery logic 320. Lightpath information discovery logic 320 requests channel attribute data from the other nodes of the network using an inter-node communication module 330 in a query message.

Each of the other nodes receives the query message on the internode communication channel. The internode-communication module 330 couples the query to the lightpath information discovery logic 320 of the receiving node, which then returns the channel attribute data 340 of the node to the originating node.

Inter-node communication module 330 may use any suitable inter-node data protocol technique, such as a data protocol utilizing the telecom markup language (TML) transmitted on an inter-node optical supervisory channel. One version of TML is disclosed in U.S. patent application Ser. No. 09/667,934 entitled "System And Method For Managing Network Devices Using Telecom Markup Language (TML) by Dulepet et al., filed Sep. 22, 2000, which is assigned to the assignee of the present invention, the contents of which are hereby incorporated by reference. In one embodiment, an EMS 230 makes lightpath information requests to a selected node using TML sent over an HTTP protocol and inter-node information requests are sent using TML format over a DCOM interface using an optical supervisory channel.

As indicated in FIG. 3, in one embodiment each node includes a data table 340 of attributes of each channel serviced by the node, which may comprise a channel table. For example, the data table may include information on wavelength channels added, dropped, or passed through the node, static attributes of components within the node that place constraints on the service that each channel can provide, or dynamic attributes of components that are monitored by the node.

Illustrative static attributes include the wavelength converter interface (WCI) type, channel action rules specifying how a wavelength may be used in a given node, or the protection type. WCIs are transponders used to convert wavelengths such that the WCI type determines aspects of how it may be used to add, drop, or passthrough payloads. Examples of WCI type include whether the WCI is adapted for 2R, 3R, 2R_850 nm, 3R_OC192, ESCON_2R, Allrate, Regional, or OC192 operation. For instance, a 3R WCI can add/drop and passthrough stm1, stm4, stm16, and GbE payloads whereas the ESCON-2R WCI can only add/drop and passthrough an ESCON payload. Channel action rules may include rules associated with specifying how a wavelength channel may be used in a node, including whether the wavelength channel is continued, dynamically regenerated, or statically regenerated. For instance, if a wavelength channel is to be added/dropped in a given node, the wavelength channel must not be continued or statically regenerated. The protection type may, for example, include unprotected, working channel access, or protect channel access. Working channel access can provide protected service, whereas unprotected or protect channel access traffic cannot.

Dynamic attributes include attributes that are populated once a lightpath has been provisioned on a given wavelength. Examples of dynamic attributes include channel state information required for dynamic regeneration, cross connect switch state associated with the state of cross connect switches in the node, or payload state information for the provisioned channel, such as whether the provisioned channel is clearchannel, stm1, stm4, stm64, GbE, ESCON, FibreChannel, sts1, or user specified.

The lightpath information discovery logic 320 of the selected node receives the channel attribute data from the other nodes and combines it with its own channel attribute data to form a consolidated data table 350. The consolidated data table 350 is analyzed using a rules engine 360 having one or more rules for implementing a desired lightpath information request. In one embodiment the lightpath information discovery logic 320 selects the rules used by rules engine 360 based upon the particular lightpath information request. In one embodiment, the channel attribute data is maintained in a channel table. In this embodiment the channel table is indexed by the channel, which may be represented by its band, channel, and node port side (e.g., Band 1, Channel 1, East Port Side of node). When channel tables from different nodes are combined, the channel is used as the index and data structures are maintained for the node to represent the channel attribute data.

The rules that may be used by the rules engine 360 to discover and/or validate lightpaths are associated with the fact that a valid lightpath must be added into the optical network at a first node with desired attributes, maintain certain attributes throughout the lightpath, and be dropped at a second node with desired attributes. An individual rule can comprise any rule that may be used to determine invalid lightpaths. A hierarchy of rules may be used to avoid conflict of two or more rules. Additionally, the rules that are utilized may be specific for the network topology and network type. For example, there may be one set of rules applied for two fiber optical multiplex section shared protection ring (2F-msOSPRing) networks and a different set of rules applied for two fiber optical channel dedicated protection ring (2F-OchODPRing) networks. While a given node may have only one set of rules programmed for a particular network topology/type (e.g. BLSR), more generally a subset of rules appropriate for the network topology/type may be selected based on network state information published to the network. Additionally, the rules that are applied by a node may also be dynamically selected to be specific for the services that are to be provisioned.

Some examples of rules for analyzing an individual lightpath include: continuity of path from an add node to the drop node, including passthrough or regeneration nodes; consistency of fault protection type for all nodes along a working path and a protection path; quality of service of a lightpath (e.g. consistency of particular quality of service or minimal quality of service level) for both working and protect paths; optical signal to noise ratio constraints on amplifier placement along the optical path; bit error rate constraints, including rules for consistent utilization of forward error correction coding/decoding; and proper operation of components associated with a lightpath, including operation of circuit packs, circuit cards, transceivers, and optical amplifiers. The rules are applied by rules engine 360 and the result is coupled to the lightpath information discovery logic 320, which outputs it via request server 310.

Figure 4A:
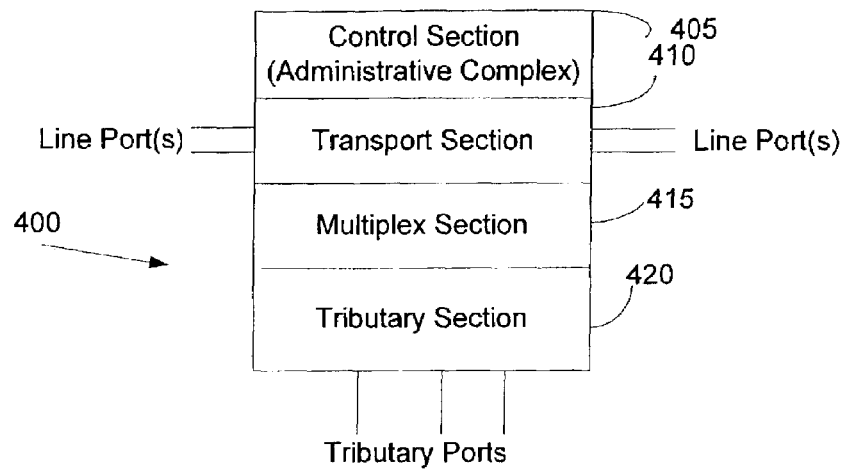
FIG. 4A is a block diagram of a WDM node according to the present invention for use in the network of FIG. 2.
Figure 4B:
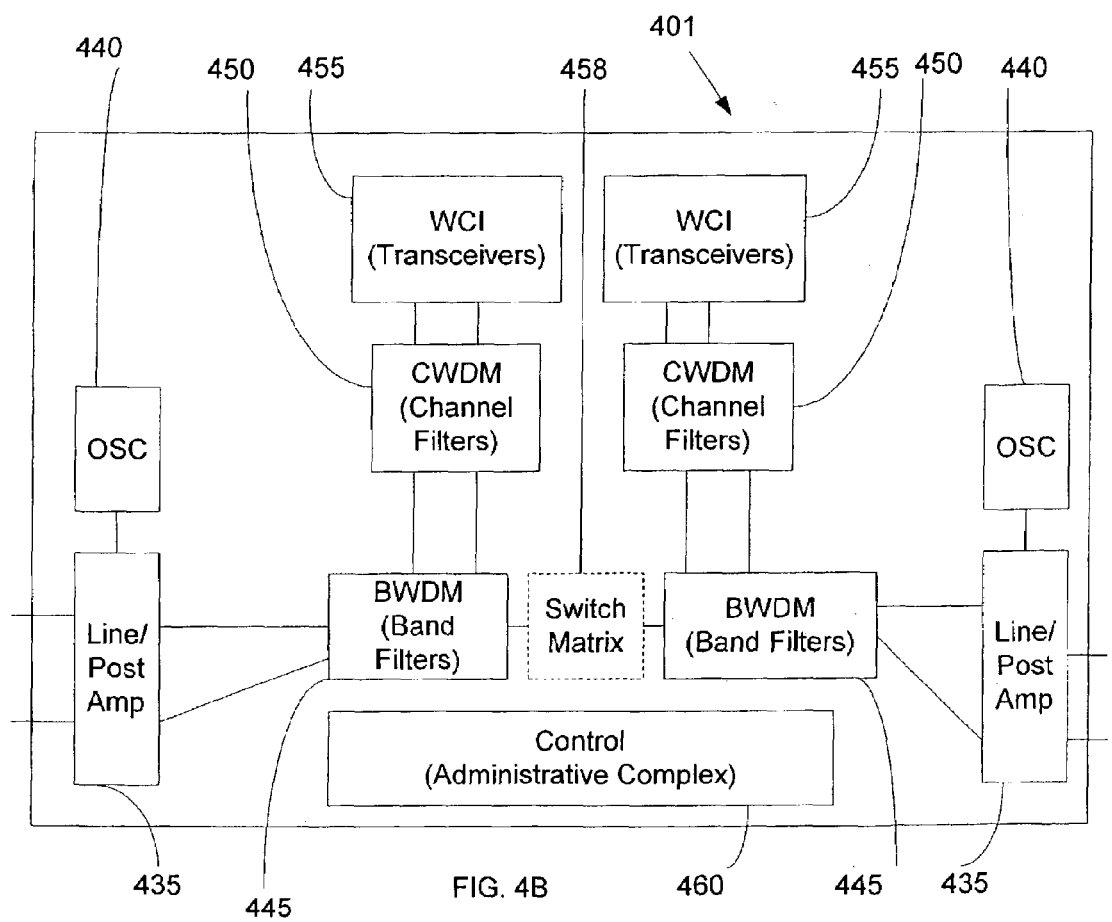
FIG. 4B is another block diagram of a WDM node according to the present invention for use in the network of FIG. 2.

FIGS. 4A and 4B illustrate additional aspects of a preferred WDM node embodiment. Referring to the functional block diagram of FIG. 4A, an individual WDM node 400 may, for example, include a control section 405 for controlling the node, communicating with an EMS, and for providing inter-node communication. A tributary section 420 provides a point of connection for a tributary network to add or drop channels and perform any required wavelength conversion. A multiplex section 415 combines signals from the tributary section into WDM format for line transmission and extracts individual received WDM channels. A transport section 410 provides for terminating optical spans between nodes and performing line switching functions. The transceivers in the tributary section receive input from the customer premise equipment (CPE). The payload contained in the input is mapped into a lightpath (from the source node to a destination node), which may then be multiplexed into multiplex section 415 by a WDM filter. An optical amplifier may be included, if required, to amplify the optical signals.

FIG. 4B shows a block diagram of a node 401 similar to that of FIG. 4A implemented using a plurality of circuit packs, various aspects of which are described in U.S. patent application Ser. No. 09/895,342 entitled "System and Method For Staggered Starting Of Embedded System Modules In An Optical Node" by Evans, filed on Jun. 29, 2001; U.S. Pat. No. 6,304,347 entitled "Optical Power Management In An Optical Network," by Beine, et al., which is assigned to the assignee of the present invention and the contents of which are hereby incorporated by reference.

Line cards 435 receive input/output optical fibers and may be coupled to one more optical pre-amplifiers or post-amplifiers. Line card 435 may include a suitable optical filter for coupling an optical supervisor channels (OSC) of an OSC circuit pack 440 to other nodes. Band wavelength division multiplexed (BWDM) circuit packs 445 permit wavelength bands of closely spaced wavelength channels to be multiplexed/demultiplexed. Individual wavelength channels are multiplexed/demultiplexed from wavelength bands using channel wavelength division multiplexer circuit packs 450. The individual channels that are added, dropped, or regenerated are coupled to appropriate transceiver modules, such as a set of transceivers configured as a wavelength converter interface (WCI) module 455 for coupling the node to a tributary network operating in a different wavelength range than the WDM network.

A switch matrix module 458 may be included to redirect optical signals responsive to a network protection condition. An administrative complex 460 includes a local computer (e.g., a microprocessor and associated memory) for providing high level administration of the node. The administrative complex 460 may also be coupled to additional monitoring and control elements.

Figure 5A:
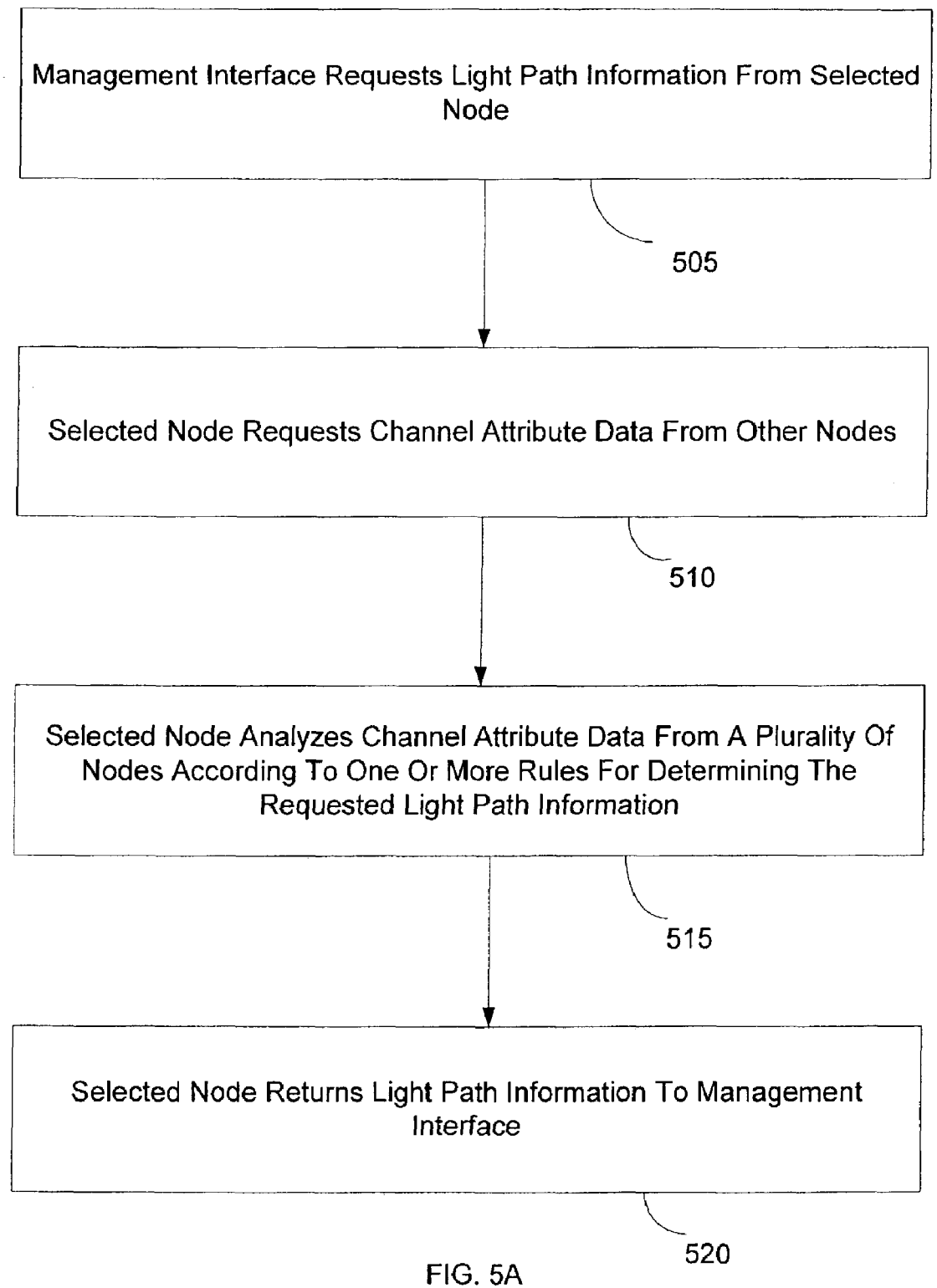
FIG. 5A is a flow chart of a method of discovering lightpath information according to the present invention.

FIG. 5A is a high level flow chart of a general method of using the lightpath information discovery module 260. Referring to the flow chart of FIG. 5A, in one embodiment of the present invention an external management interface requests 505 a selected node to provide lightpath information. The selected node requests 510 other nodes in the network for their channel attribute data. The selected node, may, for example, utilize a network map to determine the existence of other nodes in the network and request channel attribute data from the other nodes of the network using inter-node communication module 330 to communicate a query message (e.g., via a remote communication mechanism based on an optical supervisory channel). The selected node then analyzes 515 the channel attribute data of a plurality of nodes according to one or more rules selected to provide the requested lightpath information. The lightpath information is then returned 520 from the selected node to the external management interface.

Figure 5B:
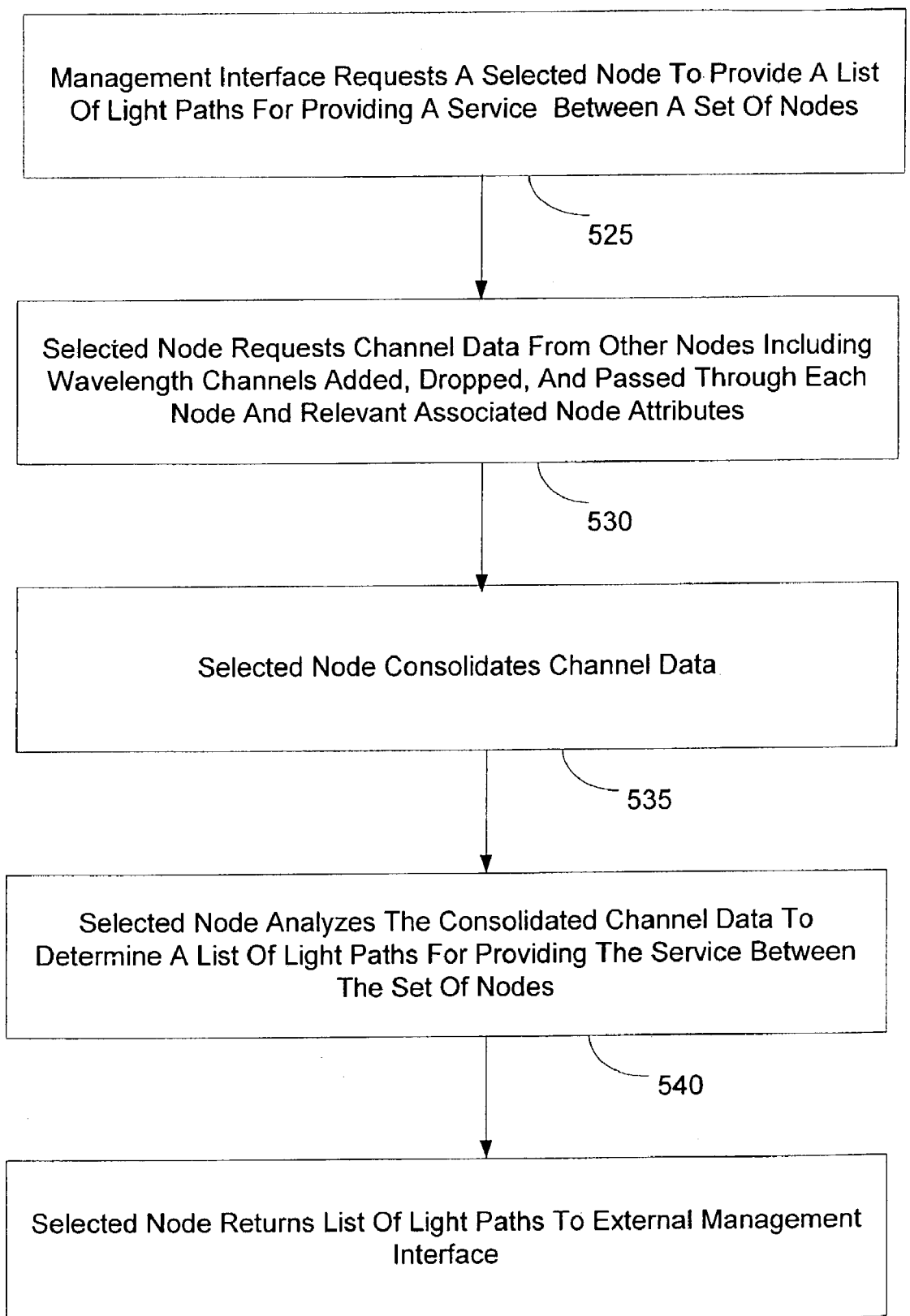
FIG. 5B is flow chart of a method of discovering lightpaths according to the present invention.
Figure 5C:
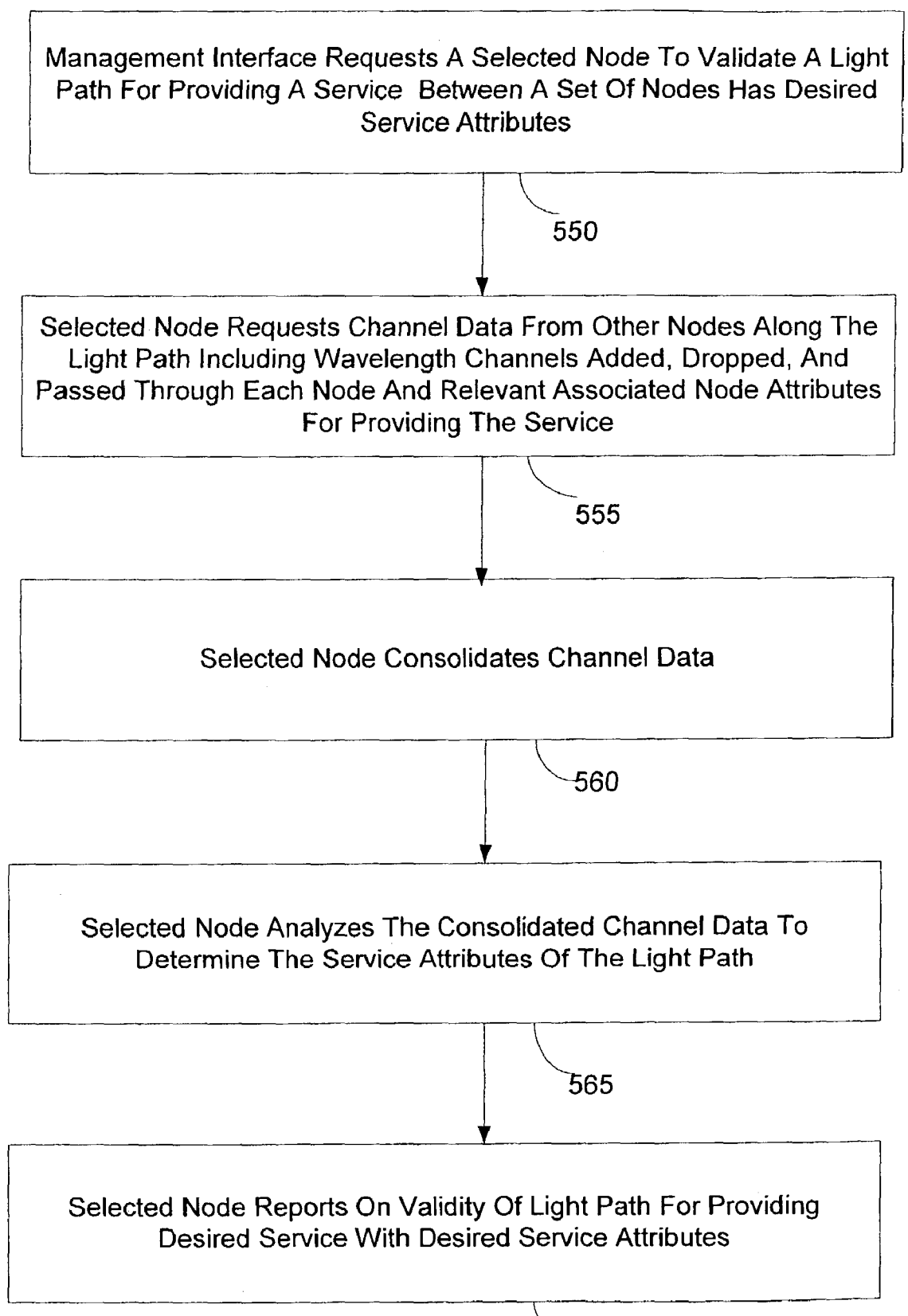
FIG. 5C is a flow of a method of validating a lightpath according to the present invention.
Figure 5D:
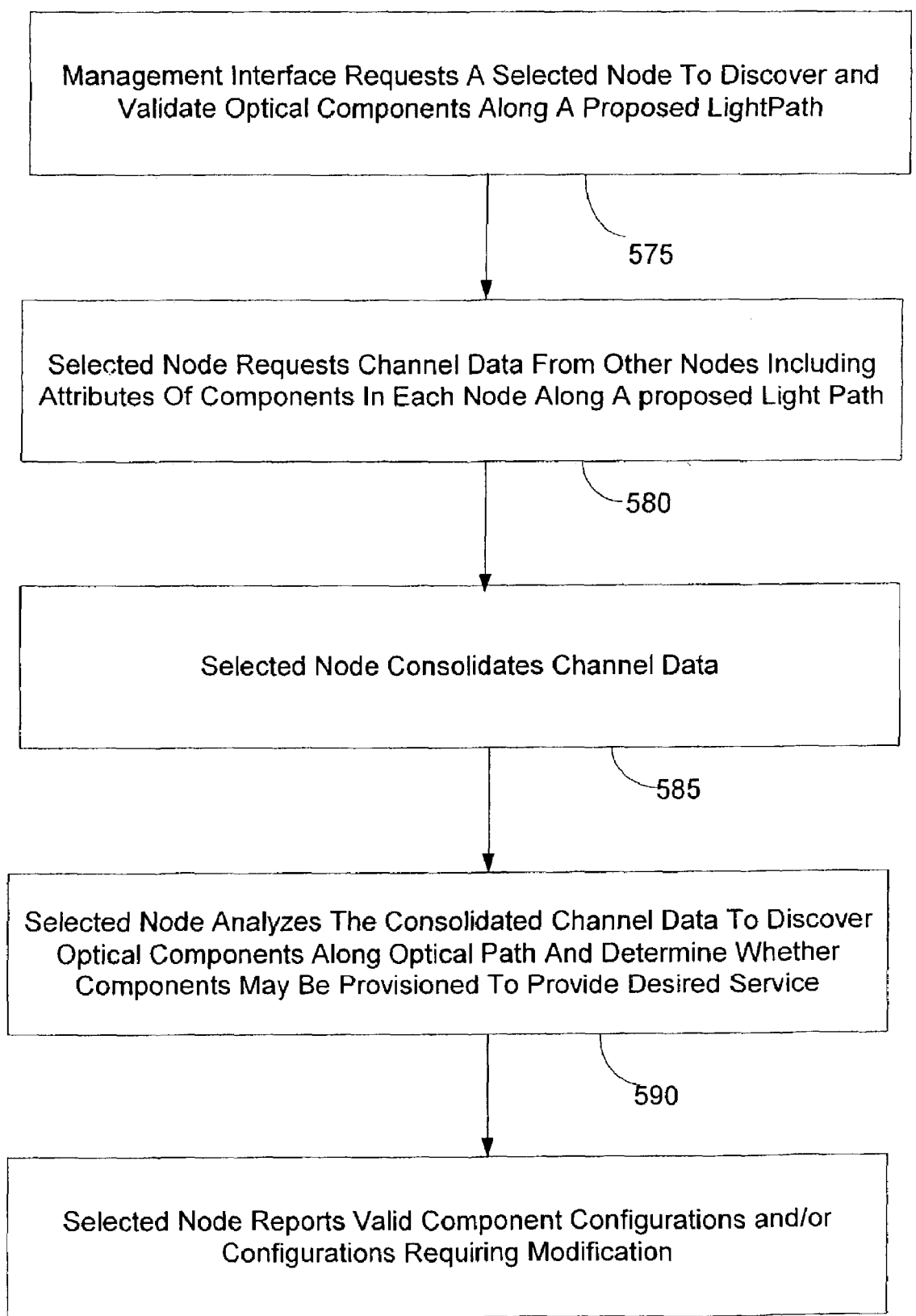
FIG. 5D is a flow chart of a method of discovering and validating optical components along a lightpath according to the present invention.

FIGS. 5B–5D illustrate in more details several lightpath information discovery methods. Referring to FIG. 5B, in one embodiment, a management interface requests a list of lightpaths for providing a desired service between two nodes 525. In some embodiments the desired service may, for example, include constraints on data rate or quality of service. The selected node requests 530 channel data from other nodes, including wavelength channels added, dropped, or passed through, along with relevant node attributes. The selected node consolidates the channel data 535. The selected node then analyzes the consolidated channel data according to one or more rules to determine a list of lightpaths 540.

In some situations, for example, it is desirable to determine if a proposed lightpath is capable of satisfying particular service constraints. Referring to FIG. 5C, in one embodiment a management interface requests a selected node to validate that a lightpath has preselected service attributes 550. The selected node requests 555 channel data from the other nodes. This may, for example, be a request for the other nodes to provide all of their channel attribute data. However, it will also be understood that the request may be limited to only information required to validate that a lightpath has a desired service attribute (e.g., wavelength channels added, dropped, or passed through the node, along with other attributes associated with validating that a lightpath has a preselected service attribute). The selected node consolidates the channel data 560. The selected node analyzes the consolidated channel data according to one or more rules to determine the service attributes of the lightpath 565. For example, if the service attribute is a data rate, all of the transceivers along the lightpath must be able to support the data rate. Similarly, if the service attribute is a protection mode to ensure a quality of service, the lightpath (and the corresponding lightpath in a protect mode) must be able to provide the desired service. The selected node then reports to the management interface on the validity of the lightpath for providing the desired service with the desired service attributes.

In some applications it is desirable to determine optical components (e.g., hardware and software) that need to be provisioned, replaced, or upgraded to provide a desired service. Consequently, as shown in FIG. 5D in one embodiment a management interface requests 575 a selected node to discover and validate optical components along a lightpath. The selected node requests 580 channel data from other nodes including attributes of components in each node along the proposed lightpath. The selected node consolidates 585 the channel data. The selected node then analyzes 590 the consolidated channel according to one or more component rules to discover optical components along the optical and determine whether the components may be provisioned to provide the desired service. The selected node reports 595 whether the component configuration of the proposed lightpath is valid or requires modification. (e.g., replacement or upgrades to hardware or software).

The methods of discovering lightpath information of FIGS. 5A–5D may be implemented as a stateless model in which the data required to process a lightpath information request is retrieved by the selected node on a per-request information. In one embodiment, the selected node requests all of the other nodes of the network to provide channel attribute data and combines it with its own channel attribute data. However, it will be understood that depending upon the nature of the lightpath information request that the selected node may limit its request to a relevant subset of the channel attribute data from the other nodes.

As previously described, the channel attribute data 250 of an individual node may be in the form of a channel table that includes information on wavelength channels added, dropped, or passed through the node. Additional channel attributes and/or node attributes related to providing a desired service may also be included in the table. Table I is an illustrative channel table. In this example the attributes of each wavelength channel serviced by the node includes the optical add drop multiplexer (OADM) mode, bit rate supported by transceivers, and whether the wavelength channel is protected.

TABLE I

Illustrative Channel Attribute Data Table Of An Individual Node.

| Wavelength Channel | OADM Mode | Supported Bit Rates | Supported Quality Of Service |
|---|---|---|---|
| 1550 nm | add-drop | OC-3, OC-12 | Protected |
| 1590 nm | passthrough | | Protected |

Table II is an illustrative example of a portion of a consolidated data table for an optical network. The selected node can then process the consolidated data to discover lightpath information. In this example, the attributes of individual wavelength channels are grouped together to facilitate analysis.

TABLE II

Illustrative Consolidated Channel Attribute Data.

| Node | OADM Mode | Supported Bit Rate | Supported Quality Of Service |
|---|---|---|---|
| Node 1 | Add drop at 1550 nm | OC-3, OC-12 | Protected |
| Node 2 | Pass through at 1550 nm | — | Protected |
| Node 3 | Add-drop at 1550 nm | OC-3 | Protected |
| Node 1 | Pass through at 1590 nm | — | Protected |

The analysis of consolidated channel attribute data required to fulfill a lightpath information request will depend upon the information required. Generally speaking, there are several rules that may be used alone or as part of a larger algorithm. First, a lightpath between two desired nodes requires add/drop capability at the desired nodes and passthrough at other, intermediate nodes. In many WDM optical networks, for example, the center optical wavelength of a data channel is the same on all of its links to facilitate pass through, although techniques to convert wavelength of an incoming wavelength channel receiving from a first link to a different wavelength transmitted to a subsequent link are known in the art. To accomplish this, each node along the lightpath requires an appropriate arrangement of optical filters and/or regenerators for a wavelength channel to pass through a node in order to have wavelength continuity. Second, the node components along each lightpath must be capable of maintaining some types of service attributes along the entire length of the lightpath. As one example, the data rate of transceivers and regenerators along the add/drop path must be capable of supporting the desired data rate. As another example, if optical link budgets are required to achieve a desired bit error rate, the amplification and/or regeneration along the optical path must be sufficient. Similarly, if forward error correction is required to achieve a desired bit error rate, the forward error correction attributes must be consistent along the optical path, e.g., an added signal employing forward error correction in an add node should be dropped in a drop node having a compatible forward error correction detection capability.

Additionally, if the service is a protected service, the protection mode of operation should also have a valid solution. For example, if the protection mechanism requires conjugate lightpaths and/or conjugate wavelengths, the network must also be capable of providing the protection mode service. As one example, in a two fiber optical multiplex section optical shared protection ring (2F-OmsOSPRing), regenerator transceivers in the shared (protecting) side must be able to support the bit rates of the requested service. As another example, in a two fiber optical channel dedicated protection ring (2F-OchODPRing), the conjugate lightpath must also be available to provide the desired service in the protection mode.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of discovering lightpath information in a wavelength division multiplexed optical network having a plurality of nodes, the method comprising:

responsive to a request for lightpath information, a selected node requesting channel attribute data from at least one other node of the wavelength division multiplexed optical network via an optical inter-node communication channel using a Telecom Markup Language (TML) format, wherein the channel attribute data from the at least one other node includes supported wavelength channel(s) and at least one corresponding attribute associated with providing an optical service on the supported wavelength channel(s); and the selected node receiving the channel attribute data from the at least one other node, consolidating the channel attribute data from the at least one other node with the channel attribute data of the selected node, and analyzing the consolidated channel attribute data using a hierarchy of rules to fulfill the request for lightpath information;

wherein the hierarchy of rules comprises determining the add/drop capabilities of the selected node and the at least one other node, determining the passthrough capabilities of the selected node and the at least one other node, and determining the sustainability of service attributes between the selected node and the at least one other node.

2. The method of claim 1, wherein the selected node receives the request from an external management interface and returns the requested lightpath information to the external management interface to fulfill the request.

3. The method of claim 2, wherein the external management interface is an element management system.

4. The method of claim 1, wherein the channel attribute data comprises wavelength channels added, dropped or passed through the node.

5. The method of claim 1, wherein the channel attribute data comprises the data rate of at least one wavelength channel.

6. The method of claim 1, wherein the channel attribute data comprises at least one quality of service attribute for at least one wavelength channel.

7. The method of claim 1, wherein the channel attribute data comprises a protection attribute.

8. The method of claim 1, wherein the request comprises a request for a list of valid lightpaths between two nodes.

9. The method of claim 1, wherein the request comprises a request to determine whether a selected lightpath is valid.

10. The method of claim 1, wherein the request comprises a request to determine components along a proposed lightpath that require provisioning.

11. The method of claim 1, wherein the request comprises a request to determine optical components along a proposed lightpath that require replacement or upgrading.

12. A method of discovering valid lightpaths in a wavelength division multiplexed optical network having a plurality of nodes, the method comprising:

requesting a selected node to discover at least one lightpath capable of providing a desired service between a first node and a second node of the wavelength division multiplexed optical network;

the selected node utilizing an optical inter-node communication system using a Telecom Markup Lanaguage (TML) format to request the other nodes of the network to provide attribute data that includes wavelength channels added, dropped, or passed through by the associated node and at least one attribute associated with providing a service on each wavelength channel;

the selected node receiving the attribute data of each of a plurality of nodes and forming consolidated attribute data;

the selected node applying a hierarchy of rules indicative of a valid lightpath to the consolidated attributed data to determine valid lightpath(s) for providing the desired service between the two nodes, the hierarchy of rules comprising determining the add/drop capabilities of the selected node and at least one other node, determining the passthrough capabilities of the selected node and the at least one other node, and determining the sustainability of service attributes between the selected node and the at least one other node; and the selected node outputting information identifying at least one valid lightpath.

13. The method of claim 12, wherein the at least one rule comprises: continuity of wavelength along an add-drop lightpath.

14. The method of claim 12, wherein the at least one rule comprises: continuity of supported data rate along an add-drop lightpath.

15. The method of claim 12, wherein the at least one rule comprises: a proposed lightpath having a valid protection mode of operation.

16. The method of claim 12, wherein the at least one rule comprises: compatible forward error correction techniques employed along the lightpath.

17. The method of claim 12, wherein the at least one rule comprises: compatible link budgets along each link of the lightpath.

18. The method of claim 12, wherein the at least one rule comprises: drop and add nodes having transceivers operable at the wavelength of the lightpath in the drop and add nodes.

19. The method of claim 12, wherein the at least one rule comprises: a lightpath passing through a node having an associated amplifier or regenerator.

20. The method of claim 12, wherein the at least one rule comprises: a lightpath passing through a node having compatible optical filter components for passing through the lightpath.

21. The method of claim 12, wherein the attribute data comprises a channel table.

22. A method of discovering lightpath information in an optical network having a plurality of optical nodes, the method comprising:

delegating lightpath discovery to a selected node;

the selected node requesting a channel table from at least one other node via an optical inter-node communication channel using a Telecom Markup Language (TML) format;

the selected node receiving the channel table of at least one other node and forming a consolidated channel table for at least a portion of the optical network; and the selected node applying a hierarchy of rules for determining a valid lightpath from the consolidated channel table and outputting a list of valid lightpaths, wherein the hierarchy of rules comprises determining the add/drop capabilities of the selected node and the at least one other node, determining the passthrough capabilities of the selected node and the at least one other node, and determining the sustainability of service attributes between the selected node and the at least one other node.

23. A method of validating a lightpath in an optical network having a plurality of optical nodes, the method comprising:

delegating lightpath validation to a selected node and providing the selected node a proposed lightpath;

the selected node requesting a channel table from at least one other node via an optical inter-node communication channel using a Telecom Markup Language (TML) format;

the selected node receiving the channel table of at least one other node and forming a consolidated channel table for at least a portion of the optical network; and the selected node applying a hierarchy of rules for determining a valid lightpath from the consolidated channel table for the proposed lightpath and reporting whether the proposed lightpath is valid, wherein the hierarchy of rules comprises determining the add/drop capabilities of the selected node and the at least one other node, determining the passthrough capabilities of the selected node and the at least one other node, and determining the sustainability of service attributes between the selected node and the at least one other node.

* * * * *